United States Patent
Hiraoka et al.

(10) Patent No.: US 6,565,764 B2
(45) Date of Patent: May 20, 2003

(54) METHOD OF MANUFACTURING A MATERIAL HAVING A FINE STRUCTURE

(75) Inventors: Toshiro Hiraoka, Tokyo (JP); Koji Asakawa, Tokyo (JP); Yasuyuki Hotta, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 09/927,937

(22) Filed: Aug. 13, 2001

(65) Prior Publication Data

US 2002/0020946 A1 Feb. 21, 2002

(30) Foreign Application Priority Data

Aug. 11, 2000 (JP) ........................................ 2000-243658

(51) Int. Cl.⁷ ................................................. B44C 1/22
(52) U.S. Cl. .............................. 216/56; 216/58; 216/62
(58) Field of Search ................................ 216/2, 17, 56, 216/58, 62; 438/705, 706, 725

(56) References Cited

U.S. PATENT DOCUMENTS

| | | | | |
|---|---|---|---|---|
| 3,415,993 A | * | 12/1968 | Fleischer et al. | ...... 216/56 UX |
| 5,675,532 A | | 10/1997 | Gemma et al. | |
| 6,125,095 A | | 9/2000 | Gemma et al. | |
| 6,197,399 B1 | | 3/2001 | Naito et al. | |
| 6,303,277 B1 | | 10/2001 | Hieda et al. | |

FOREIGN PATENT DOCUMENTS

| | | |
|---|---|---|
| JP | 2-279741 | 11/1990 |
| JP | 11-80414 | 3/1999 |

OTHER PUBLICATIONS

U.S. patent application Ser. No. 09/652,010, filed Aug. 31, 2000 pending.
U.S. patent application Ser. No. 09/927,937, filed Aug. 13, 2001 pending.
U.S. patent application Ser. No. 10/102,812, filed Mar. 22, 2002 pending.
U.S. patent application Ser. No. 09/988,721, filed Jun. 7, 2000 pending.
U.S. patent application Ser. No. 09/808,233, filed Mar. 15, 2001 pending.
U.S. patent application Ser. No. 09/651,030, filed Aug. 30, 2000 pending.
U.S. patent application Ser. No. 09/536,684, filed Mar. 28, 2000 pending.
U.S. patent application Ser. No. 10/091,481, filed Mar. 7, 2002 pending.
U.S. patent application Ser. No. 10/161,707, filed Jun. 5, 2002 pending.
*Vanessa, et al.*, Ordered Bicontinuous Nanoporous and Nonrelief Ceramic Films from Self Assembling Polymer Precursors, Nov. 26, 1999, vol. 286, pp. 1716–1719.
*Lee, et al.*, Polymerization of Monomers Containing Functional Silyl Groups.7. Porous Memberanes with Controlled Microstructures, Macromolecules, vol. 22, No. 6, 1989, pp. 2602–2606.

* cited by examiner

*Primary Examiner*—William A. Powell
(74) *Attorney, Agent, or Firm*—Oblon, Spivak, McClelland, Maier & Neustadt, P.C.

(57) ABSTRACT

Molded products may be made by a process comprising preparing a structure comprising a block copolymer or a graft copolymer having two or more phases, wherein each phase is comprised of polymer chains, decomposing the polymer chains of at least one phase of the structure, and cleaning the structure with a supercritical fluid or a sub-critical fluid, thereby removing the decomposed polymer chains from the structure. Molded products made by this method have very low levels of residual solvents, can be manufactured at a relatively low temperature in a short period of time without using large amounts of organic solvents, and without discharging large amounts of liquid waste.

31 Claims, No Drawings

METHOD OF MANUFACTURING A MATERIAL HAVING A FINE STRUCTURE

CROSS-REFERENCE TO RELATED APPLICATIONS

This application claims priority from Japanese Patent Application No. 2000-243658, filed on Aug. 11, 2000, the entire contents of which are incorporated herein by reference.

BACKGROUND OF THE INVENTION

1. Field of the Invention

This invention relates to a method of manufacturing a molded product having a fine structure from a micro-phase separated structure comprising a block copolymer or a graft copolymer, and molded products prepared thereby.

2. Discussion of the Background

Known methods of preparing a molded product having a fine structure on the nanometer scale include utilizing the micro-phase separated of a block copolymer or a graft copolymer (see, for example, Vanessa Z.-H. Chan, et al, Science, 286, 1716 (1999)). In this process, a single specific phase of a micro-phase separated structure may be selectively removed to provide a molded product having a fibrous structure, a thin film structure or a porous structure. In addition, a phase of a micro-phase separated membrane formed on a substrate may be selectively removed to provide a porous membrane or dots arranged in an array, and the porous membrane or the dot array may then be used as an etching mask to prepare a finely fabricated surface on a substrate.

Since each the polymer chains of the block copolymer or the graft copolymer are chemically bonded to each other, in order to selectively remove a specified phase of the micro-phase separated structure, the main chain of the polymer phase to be removed must be decomposed selectively. The decomposed polymer chain may be removed by various processes, such as vaporization upon heating or leaching (i.e., removal by dissolution or suspension of the decomposed polymer chain) with an organic solvent or water. However, removing the decomposed polymer chain by heat treatment or by leaching with organic solvents or water tends to cause problems in forming the desired fine structure. For example, if the heat treatment is conducted at the typical high temperature range of 200° C. or higher, in order to thermally decompose and vaporize the desired polymer phase, the fine structure of the remaining polymer phase, after heating, may be thermally degraded, for example by oxidation, or by thermal deformation if the heat treatment temperature is higher than the glass transition temperature of the remaining polymer phase. Accordingly, the molded products that can be produced by a process including a high temperature heat treatment step, as described above, are limited to molded products comprising a heat resistant polymers having high glass transition temperature, such as polyimides. Thus, such heat treatment processes may not be generally applicable to other materials.

The leaching process has the advantage of removing the decomposed polymer chains at a relatively low temperature. However, leaching is also relatively slow and often requires a long time, for example one day or more, and the throughput is low. In particular, it is extremely difficult to leach decomposed polymer from the inside of a molded product having a thickness, for example, of several millimeters or more. Furthermore, leaching processes require large amounts of organic solvents and therefore produce large amounts of liquid wastes after leaching. Thus leaching processes typically also pose environmental problems. In addition, residual organic solvent or water used in the leaching process tends to remain in the fine structure of the molded product. That is, fragments of the decomposed polymer chain remain on the inner wall of the fine structure, i.e., the fine pores formed by the removal of the specified phase. Moreover, it is difficult to completely remove these residues of polymer chain fragments and solvent (e.g., water or organic solvent) completely, because the inner wall of the microstructure and the residual polymer fragments have an extremely high affinity for the solvent.

Such residual solvents may cause various problems when such molded products are used, and therefore solvents are typically removed by thoroughly drying the molded product. However, since the fine structure of the molded product tends to be swollen and soften by the residual solvent, the fine structure may collapse if the remaining polymer forming the fine structure is heated to a temperature above its glass transition temperature.

As discussed above, producing a molded product having a fine structure by leaching and removing a decomposed polymer chain from a micro-phase separated structure with a solvent has the advantage that the decomposed polymer may be removed at a relatively low temperature. However, leaching processes have the disadvantage of requiring a long time, requiring large amounts of solvent, and producing large amounts of liquid waste. In addition, since the inner wall of the fine structure, i.e. the voids, inherently have an extremely high affinity to the leaching solvent in the fine structure, the solvent tends to remain therein, and the fine structure tends to collapse, since the inner wall of the fine structure becomes swollen and softened. Further, since the fine structure of the molded product comprises a polymer, it is prone to thermal deformation, so that sufficient heat cannot be applied to dry the residual solvent.

SUMMARY OF THE INVENTION

Accordingly, it is an object of the present invention to provide a method of producing a molded product having a fine structure comprising preparing a structure having two or more phases comprising a block copolymer or a graft copolymer, decomposing the polymer chains of at least one phase of the structure, and cleaning the structure with a supercritical fluid or a sub-critical fluid, thereby removing the decomposed polymer chains. The cleaning step may be applied at a relatively low temperatures and over a short period of time, and provides a molded porous product with a fine structure having relatively low levels of residual solvent, without using large amounts of organic solvents, and forming only small amounts of liquid wastes.

It is another object of the present invention to provide molded products having a fine porous structure, using the method of the present invention, such as filters, battery separators, contact lenses, cladding layers of optical fibers, etc.

DETAILED DESCRIPTION OF THE INVENTION

Thus, in a first embodiment, the present invention provides a method of preparing a molded product having a fine structure by first preparing a structure having two or more phases from a block copolymer or graft copolymer, decomposing the polymer chains comprising at least one phase of the structure, then cleaning the structure with a supercritical or sub-critical fluid to remove the decomposed polymer chains from the structure.

The structure comprising a block copolymer or graft copolymer may be prepared by any conventional method for forming polymeric materials, such as extrusion, compression molding, blow molding, solvent casting, and the like. The two or more phases may be present in the structure immediately upon molding, solvent casting, etc., or may be formed by a subsequent process, such as thermal annealing.

The advantage of using micro-phase separated block copolymers or graft copolymers to provide molded products having fine structure, is that expensive and complicated operations, such as lithography, are not necessary and in addition, three-dimensional structures can also be prepared.

A supercritical fluid is a gas at a temperature and a pressure above the critical point of temperature, pressure and entropy in the phase diagram. A sub-critical fluid is a gas at a temperature and a pressure near the critical point of temperature, pressure and entropy in the phase diagram. In the supercritical state, the density of the gas increases abruptly into a state that cannot be defined either a gas or a liquid. The sub-critical state can be considered to be a state of the gas just before it changes to the supercritical state. For example, the supercritical state of $CO_2$ is formed at pressures of from 19.6 MPa to 29.4 MPa, inclusive of all values and subranges therebetween (e.g., 20, 21, 22, 23, 24, 25, 26, 27, 28, and 29 MPa) at a temperature of 32° C. to 80° C., inclusive of all values and subranges therebetween (e.g., 35, 40, 45, 50, 55, 60, 65, 70, 75° C.); and the sub-critical state of $CO_2$ is at pressures of from 4.9 MPa to 7.4 MPa, inclusive of all values and subranges therebetween (e.g., 5.0, 5.2, 5.4, 5.6, 5.8, 6.0, 6.2, 6.4, 6.6, 6.8, 7.0, and 7.2 MPa) and at a temperature of from 15° C. to 31° C., inclusive of all values and subranges therebetween (e.g., 16, 17, 18, 19, 20, 21, 22, 23, 24, 25, 26, 27, 28, 29, and 30° C.). Since the density of the supercritical fluid or the sub-critical fluid is close to that of the liquid and is capable of dissolving substances for which it has a chemical affinity, the decomposed polymer chain may be dissolved by a supercritical or sub-critical fluid. Moreover, since the viscosity of a supercritical fluid is close to that of a gas, and has an extremely large diffusion coefficient compared with liquids, materials (i.e., decomposed polymer chains) may be extracted rapidly even from the deep bottom recesses of the fine pores of the fine structure. In addition, by using a supercritical fluid or sub-critical fluid to extract the decomposed polymer chains, the decomposed polymer chains may be removed at relatively low temperatures in a relatively short period of time, even from thick molded products. When a supercritical fluid or a sub-critical fluid which is a gas at a standard temperature (i.e., approximately room temperature, about 21° C.) and at a standard pressure (i.e., approximately atmospheric pressure, about 106 Pa) is used, no solvent residues remain, even if the molded product is not dried by heating. Thus, since heated drying is unnecessary, there is less risk of the fine structure being destroyed by thermal deformation.

The supercritical fluid or sub-critical fluid cleaning step, as discussed above, may be applied after an initial cleaning of the molded product with the organic solvent. However, while this process has the advantage of reducing organic solvent residues, the over-all cleaning time would not be expected to be shorter, and a greater amount of organic solvents would be used, thereby generating a larger amount of liquid waste. Such problems can be avoided by directly cleaning the molded product with a supercritical fluid or a sub-critical fluid.

In the method of the present invention, a structure having plural phases comprising a block copolymer or a graft copolymer ("a structure having plural phases" is hereinafter called "a micro-phase separated structure") is formed. Then, the main chain of a polymer of which at least one phase of the structure is comprised, is decomposed. Block copolymers are well known, and in the present invention, "block copolymer" means a copolymer comprising a plurality of individual polymer chains as partial constituent components (i.e., blocks). A typical example of a block copolymer is a linear molecular chain having a so-called A-B type di-block copolymer structure—i.e., the main polymer chain (i.e., polymer "backbone") has a structure of -(AA . . . AA)-(BB . . . BB)-, in which the A polymer chain has repeating units A, and the B polymer chain has repeating units B, which are chemically bonded at their terminal ends to each other. A block copolymer may also have three or more types of polymer "blocks" in the main chain. A tri-block copolymer may be of the A-B-A type, B-A-B type or A-B-C type, where "A", "B", and "C" represent polymer chains composed of A repeating units, B repeating units, and C repeating units, whose terminal ends are chemically bonded to each other. Block copolymers may also have the form of a star-type molecular chain, in which the same or different polymer blocks extend radially outward from a central molecular fragment (i.e., a polyvalent atom or molecule). Block copolymers comprising 4 or more blocks, for example $(A-B-A)_n$ type or $(A-B)_n$ type block copolymers may also be used. In addition to those described above, a block copolymer having a polymer chain in which at least one block comprises a random copolymer, for example -(AA . . . AA)-(BCBBBCBCBCB . . . CBB)-, may also be used.

Graft copolymers are also well known, and have a structure comprising a main polymer chain to which side chains of another polymer are attached. Several types of polymers can be attached to the main polymer chain as side chains. Graft copolymers are prepared, for example, by reacting a pre-formed polymer with either monomers or a second polymer (or additional polymers), so that the monomers bond to and polymerize from the pre-formed polymer, or the second polymer bonds to the pre-formed polymer, thereby forming a graft polymer which has a main polymer chain (i.e., the pre-formed polymer) to which side chains (i.e., the polymerized monomer or second polymer chain) are attached. In addition, the graft copolymer may be a combination of a block copolymer and a graft copolymer, in which, for example, a C polymer chain is attached (i.e., grafted) onto a block copolymer, such as an A-B type, A-B-A type or B-A-B type block copolymer.

A micro-phase separated structure formed from a block copolymer or graft copolymer, as described above, can have various structures. For example, the micro-phase separated structure can have a layered combination of several structures, such as a sea-island structure, cylinder structure, bicontinuous structure, lamellar structure, or a sea-island structure in which the sea phase has a cylinder structure or a structure, as described, for example, by Frank S. Bates, et al (Journal of Physics Today, 1999, February, 32–38p), herein incorporated by reference.

When the micro-phase separated structures described above are formed, various substances may be added to the block copolymer or the graft copolymer. For example, a homopolymer having the same polymer chain as one block of the block copolymer or the graft copolymer, various kinds of additives such as plasticizers (e.g., phthalate esters, succinate esters, epoxidized oils such as epoxidized soybean oil, epoxidized rape seed oil), anti-oxidants (e.g., phenols, aromatic amines, and condensation products thereof with aldehydes, ketones, and thio compounds, etc.), light stabilizers (e.g., hindered amines, etc.), dyes, crosslinkers (e.g., sulfur compounds, polyfunctional monomers, organic peroxides, UV photoinitiators, etc.) and various kinds of catalysts may be added. However, such additives, if added in excess, may dissolve selectively in specific phases of the micro-phase separated structure, and thereby affect the structure of the micro-phase separated structure. Therefore, the amount of additive is preferably no more than 20% by weight based on the block copolymer or the graft copolymer, more preferably 15% or less, most preferably 10% or less. However, the amount of an added polymer which phase separates with the block copolymer or the graft copolymer is not restricted. When such a polymer is added, phase separation between the block copolymer or the graft copolymer and the added polymer results in a large phase separated structure. In this case, the phase comprising the block copolymer or the graft copolymer forms a regular micro-phase separated structure, thereby forming a layered structure having a large phase separated structure and a micro-phase separated structure. Such a layered structure may also be useful in various applications. In addition, other materials such as ceramics, metals such as pigments, aerosils, fine platinum particles, or fine particles such as carbon or fibers, may also be added to form a composite body with the material.

There is no particular restriction on the method of decomposing the main skeleton of the polymer chain of which at least one phase of the block copolymer or the graft copolymer is comprised. Decomposition methods may include, for example, the ozone decomposition method of J. S. Lee, et al (Macromolecules 1989, 22, 2602–2606 pp), incorporated herein by reference, a method of decomposition using light, for example, as described in Japanese Patent Laid-Open No. 80414/1999, incorporated herein by reference, or ion exchange methods, as disclosed, for example, in Japanese Patent Laid-Open No. 279741/1990, incorporated herein by reference. In addition, energetic radiation, such as electron beams, α-rays, β-rays, heavy particle rays and X-rays may be used for decomposition.

In particular, a method of decomposing the polymer chains using electron beams (β-rays) is most preferred. The penetration depth of electron beams into a micro-phase separated molded product can be set, to some extent, by the acceleration voltage. In addition, electron beams are different from UV-rays in that electron beams can penetrate sufficiently into the inside of a molded product. For example, molded products comprised of an aromatic polymer absorb UV-rays, thereby preventing deep penetration of the UV-rays into the interior of the molded product. Moreover, the decomposition products produced by electron beams are relatively less polar and easily soluble in supercritical $CO_2$, whereas the decomposition products produced by other decomposition methods, for example, ozone decomposition, tend to form compounds having relatively high polarity, for example compounds having carbonyl groups.

Furthermore, even if the molded product is a composite with carbon, ceramic or metal, electron beams can penetrate carbon, ceramic or metal, and decompose polymer on the other side of the carbon, ceramic or metal (i.e., on the side opposite to the direction of irradiation). For instance, for molded products comprising a composite of a micro-phase separated copolymer or graft copolymer with a ceramic such as magnesia, the resultant secondary electrons produced by the electron beam irradiation of the magnesia produce more efficient decomposition of the polymer. Electron beam irradiation is also a relatively inexpensive processing method which can be used for roll-to-roll treatment. Electron beam decomposition is also excellent for structures having a thickness of several millimeters or more.

Various kinds of electron beam accelerators may be used as the irradiation source, for example, a Cockcroft-Walton accelerator, a Van de Graff accelerator, a resonant transformer accelerator, an insulating transformer or linear accelerator, and a dynamitron or high frequency accelerator.

The acceleration energy is generally from 100 to 50,000 KeV, preferably from 500 to 20,000 KeV, depending on the required penetration depth desired. If the acceleration energy is too low, the penetration depth is small and only the polymer in the vicinity of the molded product surface may be decomposed. On the other hand, if the acceleration energy is too high, the electron beam penetrates through the molded product without decomposing the polymer chain. The decomposing irradiation dose maybe about 10–300 kGy, preferably 20–200 kGy, most preferably 30–100 kGy.

The block copolymer and a graft copolymer may comprise a polymer chain decomposed by an electron-beam irradiation (i.e., a first polymer chain), and a polymer chain not decomposed by an electron-beam irradiation (i.e., a second polymer chain).

There is no particular restriction on the composition of the polymer chain decomposed by the electron-beam irradiation. Such polymer chains may include polyisobutylene, polystyrenes substituted at the α-position carbon with a methyl group, or halogenated (i.e., fluoropolymers) or acrylic resins may be used. For example, acrylic resins such as poly(alkylmethacrylates), for example PMMA (i.e., poly (methylmethacrylate)), having a high sensitivity to electron beams and which are relatively inexpensive are preferred. In addition, acrylic resins such as poly(isobutylmethacrylate), poly(s-butyl methacrylate) or poly(t-butyl methacrylate), in which the alkyl group is branched and has 6 or less carbon atoms, are preferred since these polymers have high sensitivity to the electron beams and have good solubility in supercritical fluids, particularly, supercritical $CO_2$. Fluorine-contained polymers are also preferred because their solubility in supercritical fluids, particularly supercritical $CO_2$, is excellent.

The polymer chain which is combined with the decomposable polymer chain, but which is not decomposable by electron-beam irradiation, may include polymers such as polycyclohexane, polycyclobutadiene, polynorbornene, poly(pentamethyldisilylstyrene) or poly(vinylethylene), which have excellent heat resistance and/or chemical resistance. Poly(pentamethyldisilylstyrene) is preferably ozone treated so that it forms a structure similar to polyoxycarbosilane, which has improved heat resistance. Poly(vinylethylene) is also preferably crosslinked by a radical generator or a crosslinker having a hydrosilyl group (i.e., Si—H).

Since a supercritical fluid or sub-critical fluid may plasticize a polymer chain, the polymer chain of non-decomposed polymer phase (i.e., the second polymer chain, described above), which is intended to remain after decomposition of the decomposable polymer phase (i.e., the first polymer chain, described above), may be crosslinked. The method of crosslinking is not limited, but crosslinking may be accomplished by adding an acid, a base, or a radical generating agent, etc., or by irradiating the polymer with light or an electron beam. Moreover, the ozone treatment, if used, may also cause crosslinking. Since the micro-phase separated structure itself seldom collapses, preferably, the polymer phase which is intended to remain (i.e., the second polymer chain) is crosslinked before the decomposed polymer chain (i.e., the first polymer chain) is removed. More preferably, the crosslinking is carried out before decomposing the (first) polymer chain.

After decomposing the (first) polymer chain by the method described above, the micro-phase separated structure is "cleaned" (i.e., the decomposed polymer chains are extracted) with a supercritical fluid or a sub-critical fluid during or after removal of the decomposed polymer chain.

The decomposed polymer chain may be extracted directly with the supercritical fluid or the sub-critical fluid, or the decomposed polymer chain may be first removed with a different solvent and then the molded product may be subsequently cleaned with the supercritical or sub-critical fluid, with the former method being more desirable. In addition, the inventors note that supercritical fluids have better cleaning characteristics than do sub-critical fluids.

The material used as a supercritical fluid or a sub-critical fluid may include, for example, carbon dioxide ($CO_2$), nitrogen ($N_2$), nitrogen suboxide ($N_2O$), xenon, sulfur hexafluoride ($SF_6$), ammonia, ethane, n-propane, n-butane, n-pentane, n-hexane, chlorotrifluoromethane, methanol and water. Particularly preferred materials used as supercritical fluids or sub-critical fluids are materials which gases at standard temperature and pressure, such as carbon dioxide ($CO_2$), nitrogen ($N_2$), nitrogen suboxide ($N_2O$), xenon and sulfur hexa-fluoride ($SF_6$), because such supercritical fluid or sub-critical fluid materials can easily be evaporated by reducing the pressure, thereby drying the molded product. $CO_2$ is the most preferred material, since the critical temperature is as low as 31.1° C., causes fewer problems with thermal deformation and thermal degradation of molded products having a fine structure, and is inexpensive and safe.

In order to adjust the solubility of the decomposed polymer in the supercritical or sub-critical fluid, various solvents may be added to the supercritical or sub-critical fluid as modifiers (entrainers). Examples of such modifiers for supercritical $CO_2$ may include, for example, polar solvents, particularly alcohols such as methanol and ethanol. These modifiers are particularly suitable for the extraction of a methacrylic resin polymer such as poly(butylmethacrylate) and the decomposition products of methacrylic resin polymers. The addition of alcohols may also improve the solubility of methacrylic resin polymers. In addition, since such alcohols are poor solvents for the methacrylic resin polymer at standard pressure, they can be removed rapidly from the molded product. A mixed solvent of a water-soluble organic solvent such as methanol and water may also be used as the modifier, and is particularly suitable for the extraction of a water-soluble polymer chain. Ionic substances can also be extracted by adding an acidic substance or a basic substance. As described below, volatile acidic or basic substances are suitable for the cyclic use of a supercritical fluid. Specifically, the acidic substance may include, for example, acetic acid, trifluoroacetic acid or formic acid, and the basic substance may include, for example, triethylamine. Furthermore, modifiers may include halogenated organic solvents such as methylene chloride or aromatic organic solvents such as toluene. Methylene chloride or the like is excellent for extracting polystyrene derivatives. Modifiers may also include surfactants, such as conventional anionic (e.g., fatty acid carboxylates, fatty acid sulfonates, etc.), cationic (e.g., alkyl quaternary amines), and nonionic surfactants (e.g., polyalkylene oxides). After cleaning the molded product with the combination of a modifier and supercritical fluid or sub-critical fluid, the modifier is preferably removed from the molded product by an additional cleaning step, using the supercritical fluid or sub-critical fluid without a modifier.

The solubility of the decomposed polymer in a supercritical fluid or sub-critical fluid may be easily controlled by changing the pressure and the temperature at which the molded product is cleaned with the supercritical or sub-critical fluid. Thus, it is possible to control the solubility to such an extent that the decomposed polymer chain may be selectively dissolved, without dissolving the polymer phase which is intended to form the structure of the molded product. In addition, when the pressure and the temperature of the supercritical or sub-critical fluid are changed, for example, reduced to room temperature and room pressure, the solubility of the solute (i.e., the dissolved decomposed polymer) chain is greatly reduced. Since this lowers the affinity of the fluid to the inner wall of the fine structure, the fluid can be removed easily from the fine structure. Furthermore, the reduced solvating power of the fluid prevents the fine structure from becoming swollen and softened by the fluid, and thereby reduces the probability that the fine structure may collapse.

If a supercritical fluid or a sub-critical fluid which is a gas at standard pressure is used, the fluid evaporates when the pressure is reduced to room pressure after cleaning, and therefore a drying step is not required. The temperature of the supercritical or sub-critical fluid cleaning process can be changed by heating or cooling the cleaning container, or by heating or cooling the supercritical fluid or the sub-critical fluid injected into the cleaning container. The pressure can be changed easily, for example, by providing the cleaning container with a pressure control valve.

The polymer chain extracted or leached out by the supercritical fluid or sub-critical fluid can be recovered easily with no thermal degradation by changing the solubility of the fluid (i.e., thereby precipitating the extracted polymer) or by evaporating the fluid. Accordingly, the preferred decomposing processes include ion exchange, hydrolyzing a main polymer comprising ester bonds or amino bonds, or decomposing a polymer chain comprising PMMA (poly(methyl methacrylate)) using an electron beam, since the recovered polymer chain may be reused as a starting material.

Further, when a supercritical fluid or sub-critical fluid which is a gas at standard temperature and pressure is used, after cleaning the fluid vaporizes into a gas when returned to standard temperature and pressure and has the effect of inflating the fine structure thereby preventing its collapse.

The supercritical fluid or sub-critical fluid may be recirculated and reused. That is, the supercritical fluid or sub-critical fluid introduced into a cleaning container containing the polymer molded product described above, comprising a block copolymer or a graft copolymer, may be discharged out of the cleaning container after extracting and dissolving the decomposed polymer. After discharge, the decomposed polymer may be separated and removed by depressurizing the supercritical or sub-critical fluid, which may then be pressurized again and returned into the cleaning container. The decomposed polymer may also be separated and removed from the fluid by changing the temperature of the fluid, for example, by cooling. If the decomposed polymer is adsorbed and removed using an adsorbent, the cleaning apparatus can be simplified, since depressurization or cooling are not required, and the operating cost of the process can also be decreased.

The remaining polymer chain (i.e., the second polymer chain) which forms the fine structure of the molded product, is not decomposed and removed and is preferably three dimensionally crosslinked. Crosslinking may be carried out simultaneously with the decomposition of the polymer chain to be removed (i.e., the first polymer chain), or crosslinking may be carried out in an independent step. Three dimensional crosslinking can prevent the remaining polymer from leaching simultaneously with the decomposed polymer, or prevent the remaining polymer from being swollen or softened upon removing the decomposed polymer during the above-described cleaning step. Decomposition by β-ray irradiation is preferred since any double bonds in the remaining polymer chain may be crosslinked by the β-ray irradiation.

The method of manufacturing a molded product having a fine structure of the present invention provides molded products having a porous body. In addition, such molded products having a fine structure, made by the process of the present invention, may be used to fabricate other materials which have a fine structure.

For example, a thin film comprising a micro-phase separated structure may be formed on a substrate comprising a silicon wafer, glass, ceramic, semiconductor material, or metal, and the polymer chain of which the specified phase to be decomposed is comprised may be removed by cleaning the micro-phase separated structure with a supercritical fluid. When etching, such as dry etching or wet etching, is carried out using the remaining phase of the molded product, which has a fine structure, as an etching mask, the fine structure is transferred to the substrate. For example, when a film comprising a sea-island structure is formed on a substrate, the sea-phase is removed to form a porous film and the substrate is etched by an RIE method or the like, a structure can be formed on the surface of the substrate in which the fine pores are arranged in a polka dot pattern.

A layer for transferring a pattern (i.e., a transfer layer) is formed on the surface of a substrate, and then a thin film of a micro-phase separated structure is formed thereon. The polymer chain of which the specified phase of the micro-phase separated structure to be decomposed is comprised, is then decomposed and removed by cleaning with a supercritical fluid. The transfer layer is then modified using the fine structure of thin film of the molded product as an etching mask. The substrate then may be modified using the transfer layer as an etching mask. Since the etching conditions for etching for the transfer layer and etching the substrate can be different, the substrate may comprise a broader selection of different materials.

If the molded product is filled with a metal by processes such as plating, vapor deposition, sputtering or CVD, a fine structure comprising metal, metal oxide or silicon can also be formed on the substrate. Using the fine structure of the metal as an etching mask, the substrate can be further etched. A high density magnetic recording medium comprising magnetic particles of uniform size, or a single electronic device may be formed by the use of the above-described method for fabricating a substrate.

As described above, it is possible to produce molded products having a fine structure from various micro-phase separated structures using the method of the present invention for preparing a molded product having a fine structure. For example, fibrous structures based on the cylinder type phase separation structure, and porous structures based on the bicontinuous type phase separation structure may be prepared. Such molded products may be used for various types of filters such as hollow fiber filters, fibers having various fine structures such as ultra-fine fibers, materials for artificial organs such as artificial blood vessels, mounting materials such as substrate materials, materials for cell members such as separators, and optical members such as optical fibers, anti-reflection films and contact lenses. For example, an ultra-fine fiber may be produced from a molded product having a cylinder structure.

Filters or separators having a uniform pore size may be manufactured from films having a bicontinuous structure. Since the pore diameter is fine and uniform, the filter can also be used as a virus removing filter for producing blood preparations in which precise control of the pore diameter is required. The separator may be manufactured in porous form, and then incorporated into electrochemical cells such as an electric cell, or it may be made porous after being combined with an electrode. For example, after assembling a cell using the block copolymer or the graft copolymer as a binder or a separator, the cell is irradiated with an electron beam, then cleaned with a supercritical fluid to form a porous structure. Electron beams at high acceleration are preferred, since they can easily penetrate the metal or carbon collector or electrode active material to decompose the polymer.

A molded product of the present invention, having a fine porous structure can also be used as a gel for electrophoretic analysis. For example, gels having a pore diameter of several tens of nanometers are used for electrophoresis of DNA fragments; a porous structure produced from a micro-phase separated structure according to the method of the present invention is most suitable for such an application. Since the pore diameter can be controlled accurately, it is possible to control the separation characteristics of DNA fragments. Furthermore, such gels have excellent storage stability and are easier to handle than conventional acrylamide gels. Furthermore, the properties of the inner walls of the pores of porous structures, manufactured by the method of the present invention, can be designed relatively freely. That is, the inner wall of the pores may be covered with fragments of the same polymer chain which is removed after decomposition. Accordingly, the property of the inner wall of the pores can be modified by appropriate selection of the polymer chain to be removed. Such properties are also effective, for example, in gels for the separation of DNA fragments.

Optical fibers may include optical fibers having a molded product of a porous body having a bicontinuous structure in the cladding layer. Since the porous structure manufactured from a micro-phase separated structure may be extremely fine, it scatters light less. Therefore, the refractive index of the cladding may be decreased greatly because of the porous structure. Accordingly, it is possible to provide an optical fiber with less loss even when the incident angle of the light to the central axis of the fiber is large.

In addition, since a molded product having a porous structure has many voids, its refractive index is low. Therefore, by forming a thin film of the porous structure on a specified substrate (i.e., a computer monitor or a window), it may also be used as an anti-reflection film.

Further, a contact lens having excellent oxygen permeability can be obtained by molded a block copolymer or a graft copolymer into a lens shape and then making them porous, preferably, by electron beam irradiation and supercritical cleaning. Since the porous structure formed by the process of the present invention has a fine and uniform pore size, it scatters light less and has excellent transparency, and in addition can prevent the intrusion of bacteria or viri. In addition, porous structures formed from bicontinuous microphase separated structures have excellent oxygen permeability because the pores are formed continuously in a three dimensional manner. Further, since the lens surface has fine unevenness, it is highly biocompatible and can reduce damage to the surface of the cornea.

A Gyroid structure or OBDD structure is another example of a bicontinuous structure. A porous structure produced from a micro-phase separated bicontinuous structure may be described as a structure having a correlation distance of both $2\sqrt{3}$ times and 4 times the radius of rotation of a cross section of a micro-domain of which the porous structure is comprised. A correlation distance is the distance where the probability of existence of a peripheral domain from the center of a central domain has a maximum value (i.e., the distance at which the probability that a peripheral domain is not a pore but a filled region). Such a structure may be confirmed easily by scanning electron microscopy (SEM) analysis, or by the position of the diffraction peak observed by a small angle X-ray scattering analysis.

The process of the present invention may be used to produce various kinds of precision filters such as hollow fiber filters, fibers, materials for artificial organs, mounting materials, optical components and materials for electrochemical cells such as electric cells, or the fine fabrication of magnetic recording media or unitary electronic devices.

EXAMPLES

Having generally described this invention, a further understanding can be obtained by reference to certain specific examples which are provided herein for purposes of illustration only, and are not intended to be limiting unless otherwise specified.

Example 1 and Comparative Example 1

Preparation of a Poly(Vinyl Ethylene) Porous Film by β-Ray Irradiation

A di-block copolymer comprising polyvinyl ethylene (PVE) and poly(t-butylmethacrylate) (PtBMA) was synthesized by a living anionic polymerization method. PVE was prepared by polymerizing butadiene in anhydrous tetrahydrofliran at 0° C. using secondary butyl lithium as an initiator. After adding diphenyl ethylene to the reactor, t-butylmethacrylate was added and polymerization was conducted at −78° C. to provide a di-block copolymer of PVE and PtBMA, having a weight average molecular weight $M_w$=288,000 (PVE molecular weight=91,000, PtBMA molecular weight=197,000) and $M_w/M_n$=1.10.

A 10 wt % solution of a mixture prepared by adding 1.7 wt % of 3,3',4,4'-tetra(t-butylperoxycarbonyl)benzophenone (BTTB) to the resultant di-block copolymer in cyclohexanone solution was coated onto a glass plate using an applicator, to provide a cast film of a di-block copolymer of 20 μm thickness. The cast film was heat treated in a nitrogen gas stream at 135° C. for 2 hours. A microphase separated structure was formed in the cast film by the heat treatment and PVE was crosslinked with BTTB.

After the heat treatment, the film was irradiated with β-rays at 2 MeV and a dose of 160 kGy to decompose the PMMA phase.

The irradiated film was then cleaned with supercritical $CO_2$ at a cleaning pressure of 25 MPa, a cleaning temperature of 40° C., at a liquefied $CO_2$ flow rate of 30 ml/min, using methanol as a modifier at a methanol flow rate of 3 ml/min for 5 min, 10 ml/min for 60 min and 0 ml/min for 5 min. After the end of the cleaning, the pressure was reduced to standard pressure over 5 min.

The supercritical $CO_2$ cleaning apparatus comprised an autoclave equipped with a supercritical $CO_2$ feeding pump and a modifier injection pump disposed upstream of the autoclave, and a fully automatic pressure control valve disposed downstream of the autoclave. The temperature of the autoclave was controlled using an oven. The cleaning pressure was controlled by the fully automatic pressure control valve. A differential refractive index detector and a UV spectrophotometer were attached between the autoclave and the fully automatic control valve, in order to monitor the amount of PtBMA decomposition products discharged. Cleaning was stopped when the PtBMA decomposition products were no longer detected.

After cleaning, a cross section of the cast film was analyzed by SEM, and a three dimensionally porous structure comprising a three dimensional branched crosslinked PVE phase of about 50 nm diameter was observed.

As Comparative Example 1, a three dimensional porous structure was prepared in the same manner as in Example 1, above, except that the structure was cleaned with ethyl lactate at 40° C. for 1 day instead of supercritical $CO_2$. As a result, although a three dimensional porous structure similar to that obtained by supercritical $CO_2$ cleaning was obtained, regions in which the PtBMA phase was only partially removed were observed demonstrating that the decomposed polymer phase (i.e., PtBMA) was not completely removed. In addition, the porous structure was either partially collapsed, or a dense layer on the surface was formed by the collapse of the porous structure. It is believed that this collapse of the fine structure may be attributed to plasticization of the porous structure by ethyl lactate. From the foregoing, cleaning the micro-phase separated structure with supercritical $CO_2$ appears to prevent the collapse of the porous structure, and in addition may be carried out in a much shorter period of time.

Example 2

Preparation of a Poly(Vinylethylene) Porous Molded Product by β-ray Irradiation

A powder mixture formed by adding 1.7 wt % of 3,3',4, 4'-tetra-(t-butylperoxycarbonyl)benzophenone (BTTB) to the same di-block copolymer of Example 1 was molded under conditions of heat and pressure into a rectangular body having a length and width of 2 cm each and a thickness of 5 mm. The molded product was further heat treated in a gas stream at 135° C. for 2 hours. After heat treatment, the molded product was irradiated with β-rays from both the front surface and rear face of the molded product to decompose the PtBMA, each irradiation carried at 2 MeV and a dose of 160 kGy.

The molded product was the cleaned with supercritical $CO_2$, using the supercritical $CO_2$ cleaning apparatus described in the Example 1, at a cleaning pressure of 25 MPa, a cleaning temperature of 40° C. and a liquefied $CO_2$ flow rate of 30 ml/min, using methanol as the modifier at a methanol flow rate of 3 ml/min for 10 min, 10 ml/min for 90 min and 0 ml/min for 5 min. After the cleaning was completed, the pressure was decreased to standard pressure over a 5 min period.

When a cross section of the cast film was analyzed after cleaning by SEM, a three dimensional porous structure similar to that of the molded product of Example 1 was observed.

Example 3 and Comparative Example 2

Preparation of a Poly(Vinylethylene) Porous Film by β-ray Irradiation

A di-block copolymer comprising poly(vinyl ethylene) (PVE) and poly(isobutyl methacrylate) (PiBMA) was synthesized by a living anionic polymerization method. The PVE was prepared by polymerizing butadiene in anhydrous tetrahydrofuran at 0° C. using secondary butyl lithium as an initiator. Then, after adding diphenyl ethylene, isobutyl methacrylate was added and polymerization was carried out at −78° C. to provide a di-block copolymer of PVE and PiBMA having a weight average molecular weight $M_w$=275,000 (PVE molecular weight=86,000, PBMA molecular weight=189,000) and $M_w/M_n$=1.12.

10 wt % solution of a mixture prepared by adding 1.7 wt % of 3,3',4,4'-tetra(t-butylperoxycarbonyl)benzophenone (BTTB) to the resultant di-block copolymer dissolved in cyclohexanone was coated onto a glass plate using an applicator, to provide a 20 μm thick cast film of the di-block copolymer. The cast film was heat treated in a nitrogen gas stream at 135° C. for 2 hours to form a micro-phase separated structure, and the PVE was crosslinked with BTTB.

After the heat treatment, the film was irradiated with β-rays at 250 KeV and a dose of 200 kGy to decompose the PiBMA phase.

The 1 g-cast film was then cleaned with supercritical $CO_2$ at a cleaning pressure of 25 MPa, a cleaning temperature of 40° C., a liquefied $CO_2$ flow rate of 30 ml/min, with methanol added as a modifier at a methanol flow rate of 3 ml/min for 10 min, 10 ml/min for 60 min, 0 ml/min for 5 min. After the end of the cleaning process, the pressure was reduced to standard pressure over a 5 min period.

The supercritical $CO_2$ cleaning apparatus was an autoclave equipped with a supercritical $CO_2$ feed pump and a modifier injection pump attached upstream of the autoclave, and a fully automatic pressure control valve disposed downstream of the autoclave. The temperature of the autoclave was controlled by an oven. The cleaning pressure was controlled by the fully automatic pressure control valve. A differential refractive index detector and a UV spectrophotometer were attached between the autoclave and the fully automatic control valve to monitor the amount of PiBMA decomposition products discharged. Cleaning was stopped when no more PiBMA decomposition products were detected in the discharge.

A cross section of the cast film was analyzed after cleaning by SEM, and a three dimensionally porous structure comprising three dimensional branched crosslinked PVE phase of about 50 nm diameter was observed. When a cast film of a di-block copolymer comprising a poly(s-butyl methacrylate) (PsBMA) instead of PiBM was prepared and cleaned with supercritical $CO_2$ in the same manner described above, a similar porous body of PsBMA was obtained.

As Comparative Example 2, a cast film was prepared and cleaned with supercritical $CO_2$ as described as in Example 3, except that the di-block copolymer comprised poly(vinyl ethylene) (PVE) and poly(methyl methacrylate) (PMMA) rather than poly(vinyl ethyl) (PVE) and poly(isobutyl methacrylate) (PiBMA). The film was irradiated with β-rays at 2 MeV and 160 kGy. The PMMA phase was not completely removed and the molded product was not porous enough. Thus, high quality porous film can be obtained using PiBMA, PsBMA or PtBMA, which have excellent solubility in supercritical $CO_2$ after irradiation, rather than PMMA, which does not.

Example 4

Preparation of a Porous Film by Ozone Decomposition

A toluene solution of a PI (molecular weight=24,000)–PPDS (molecular weight=100,000)–PI (molecular weight=26,000) type tri-block copolymer of poly(pentamethyldisilyl styrene) (PPDS) and polyisoprene (PI) was coated onto a glass plate using an applicator to form a 5 μm thick cast film. After coating, the film was heat treated at 135° C. for 2 hours. After the heat treatment, the film was UV irradiated in an ozone gas stream using a low-pressure mercury lamp.

The cast film was then cleaned with supercritical $CO_2$ using the same supercritical $CO_2$ cleaning apparatus as in Example 1, using a 1:1 mixed solution of methanol and water as a modifier, injected at a flow rate of 10 ml/min, at a cleaning pressure of 25 MPa and a cleaning temperature of 40° C., and at a liquefied $CO_2$ flow rate of 30 ml/min, for one hour. The resulting cast film had a three-dimensional network-like porous structure having a pore size of about 100 nm.

If the cast film was cleaned with water or methanol for one hour, instead of supercritical $CO_2$ for one hour, the resulting films were not sufficiently porous.

Example 5

Preparation of a Porous Clad Optical Fiber by β-Irradiation

A toluene solution of a PPDS (molecular weight=46,900)–PMMA (molecular weight=142,000) type di-block copolymer of poly(pentamethyldisilylstyrene) (PPDS) and poly(t-butylmethacrylate)(PtBMA) was coated to a thickness of 20 μm on a 50 μm diameter quartz glass fiber and then heat treated at 135° C. for 2 hours. After the heat treatment, the coated fiber was irradiated with β-rays at 2 MeV and a dose of 160 kGy to decompose the PtBMA phase. The coated fiber was then cleaned with supercritical $CO_2$ according to the cleaning process of Example 1.

The resulting three-dimensional porous structure produced from the bicontinuous phase separated structure of the coating comprised a three-dimensionally branched crosslinked PVE phase of about 30 nm diameter. The refractive index of the coating film was 1.2 or less. The angle of incident light could be increased by 10% or more compared to a similar optical fiber having a PPDS homopolymer cladding layer.

Example 6

Preparation of a Porous Contact Lens with β-Ray Irradiation

A molded product of a poly(pentamethyl disilyl styrene) (PPDS) (molecular weight=146,000)–poly(t-butylmethacrylate) (PtBMA) (molecular weight=45,000) type di-block copolymer comprising (PPDS) and (PMMA) was heat treated at 135° C. for 2 hours. After the heat treatment, the molded product was cut into a lens and irradiated. With β-rays at 2 MeV and a dose of 160 kGy to decompose the PtBMA phase.

After the irradiation, the lens was cleaned with supercritical $CO_2$ in the same manner as in Example 1. The resulting three-dimensional porous structure produced from the bicontinuous type phase separated structure comprising PPDS had three dimensionally continuous pores of about 30 nm diameter. After a hydrophilic treatment, in which water was incorporated, the lens was found to have excellent oxygen permeability.

Example 7

Preparation of a Separator and an Electric Cell by β-Ray Irradiation

A preliminary test was first conducted using a porous film prepared from a block copolymer as a separator for a lithium ion secondary battery.

A di-block copolymer comprising poly(vinylidene fluoride) (PVDF) and poly(t-butylmethacrylate) (PtBMA) (weight average molecular weight Mw=9,000, Mw/Mn=2.2, PVDF weight %=66%) was dissolved in a solvent and 3 wt % silica (Tokuseal P, manufactured by Tokuyama Soda Co.) was added. The solution was cast to provide a cast film of the di-block copolymer. The cast film was then heat treated in a gas stream at 135° C. for 2 hours to form a phase separated structure in the cast film. The phase separated film was the irradiated with β-rays at 2 MeV and a dose of 160 kGy to decompose the PtBMA phase and, simultaneously, crosslink the poly(vinylidene fluoride) phase into a gel.

The films was the cleaned with supercritical $CO_2$ in the same manner as in Example 1 to remove the decomposed PtBMA. A three-dimensional porous structure was produced from the bicontinuous type phase separated structure, comprising a three-dimensionally branched crosslinked PVDF phase of about 50 nm diameters.

Anhydrous $LiPF_6$ was then dissolved in a mixed solvent of propylene carbonate–dimethyl carbonate (1:1) to provide a 1 M electrolyte solution. After impregnating the approximately 50 μm porous film with the electrolyte, the films was punched into a 0.5 cm diameter disk. The electrolyte-impregnated porous film were placed between platinum electrodes in a cell, and the AC impedance thereof was measured using an impedance gain phase analyzer (Schlumberger Instruments Co., 1260) at room temperature and at a frequency of 30 MHz-0.05 Hz. A excellent ionic conductivity of 4 $mScm^{-1}$ at 25° C. was measured, and the electrolyte was retained in the porous film with no liquid sagging.

A lithium ion secondary battery was prepared as described below.

$LiCoO_2$ was used as a positive electrode active substance, and was heated and dried in an argon atmosphere at 300° C. for 3 hours. The dried $LiCoO_2$, conductive carbon black and the di-block copolymer described above were mixed at a weight ratio of 85:10:5, a small amount of dimethyl formamide (DMF) was added, and the mixture was kneaded. The kneaded mixture was uniformly coated and dried on a 20 μm thick and 4 cm×4.5 cm aluminum mesh current collector to provide an approximately 50 μm thick positive electrode. The amount of $LiCoO_2$ per unit area of the resulting positive electrode was 17 mg/cm². The positive electrode active substance had a capacity of 150 mAh/g.

Hard carbon prepared by baking furfuryl alcohol resin at 1100° C. (i.e., a less graphatizable carbon) was used as a negative electrode active substance. The hard carbon was heated and dried in an argon atmosphere at 600° C. for 3 hours. The dried hard carbon, conductive carbon black and the di-block copolymer described above were mixed at a weight ratio of 85:10:5, a small amount of DMF was added, and the mixture was then kneaded. The kneaded mixture was uniformly coated and dried on a 20 μm thick and 4 cm×4.5 cm copper mesh to provide a negative electrode having a thickness of about 50 μm. The amount of hard carbon per unit area of the resulting negative electrode was 7 mg/cm². The negative electrode active substance had a capacity of 300 mAh/g.

The di-block copolymer was dissolved in a solvent, and 3 wt % silica (Tokuseal P, manufactured by Tokuyama Soda Co.) was added. The solution was then cast to provide a cast film of the di-block copolymer.

After laminating the positive electrode, the cast film and the negative electrode together, in this order, they were press bonded in a hot press. After heat treating the resulting laminate in a nitrogen gas stream at 135° C. for 2 hours, the laminate was irradiated with β-rays at 2 MeV and a dose of 160 kGy. After irradiation, the laminate was cleaned with supercritical $CO_2$ as in Example 1 to remove the poly(t-butylmethacrylate) phase of the di-block copolymer.

Anhydrous $LiPF_6$ was dissolved in a mixed solvent of propylene carbonate-dimethyl carbonate (1:1) to provide a 1 M electrolyte solution.

The laminate was dipped into and impregnated with the electrolyte, then wrapped with a waterproof and airtight aluminum laminate film and sealed in an argon gas stream. External electrode terminals were attached to the negative electrode and the positive electrode, respectively, to provide a lithium ion secondary battery. The resulting lithium ion secondary battery was charged at a constant current of 50 A/cm², and after reaching a cell voltage of 4.2 V, it was charged at a constant voltage. The charging time was determined to be the time required to obtain a 30% excess capacity relative to the capacity of the negative electrode active substance capacity of 300 mAh/g. After the charging was completed, the cell was allowed to stand for a recess time of 30 min, and then discharged at a constant current of 50 A/cm² until the cell voltage decreased to 2.5 V. After discharging was completed, the cell was then allowed to stand for a recess time of 30 min. This charge/discharge cycle was repeated using the procedure described above being (one cycle is one complete charge and discharge of the cell). The cell capacity per 1 g of the negative electrode active substance (i.e., hard carbon) on every cycle (negative electrode converted capacity mAh/g), and the charge/discharge efficiency (ratio of discharged capacity to charged capacity) (%) was measured.

After 500 charge/discharge cycle cycles, no significant change was observed in the charge/discharge curve and it could seen that the cell retained 80% or more of its capacity, thereby indicating that it has excellent charge/discharge cycle properties. Furthermore, no internal short circuits occurred.

Example 8

Patterning

A filtered 2 wt % solution of PS (molecular weight=65,000)-PtMBA(molecular weight=13,200) type di-block copolymer of polystyrene (PS) and poly(t-butyl methacrylate) (PtBMA) in a solution of propylene glycol monoethyl ether acetate (PGMEA) was spin coated at 2500 rpm on a 3 inch diameter glass substrate. After evaporating the solvent at 110° C. for 90 sec, the film was annealed under a nitrogen atmosphere in an oven at 210° C. for 10 min and, successively, at 135° C. for 10 hours to provide a microphase separated film. The film was then irradiated with β-rays at 2 MeV and a dose of 160 kGy. After the irradiation, the film was cleaned with supercritical $CO_2$ using the same method as in Example 1 to remove the PtBMA methacrylate phase of the di-block copolymer. The substrate was then etched for one min, with hydrofluoric acid using the pattern formed by the remained PS as a mask. The substrate was then supersonically cleaned in acetone to remove the residual mask.

The resulting etched substrate had 15 nm diameter by 12 nm deep pores formed substantially at equal distances, at a density of about 700 pores per square μm on the entire surface of the glass substrate.

As described above the various embodiments of the present invention are molded products having a fine structure, produced by preparing a micro-phase separated structure comprising a block copolymer or a graft copolymer, decomposing at least one phase of the micro-phase separated structure, removing the decomposed polymer chains at a relatively low temperature and in a short period of time by means of a supercritical or sub-critical fluid cleaning process, thereby providing a porous molded product having lower levels of residual solvent, without using a large amounts of organic solvents, producing little liquid waste.

Additional advantages and modifications will readily occur to those skilled in the art. Accordingly, the invention in its broader aspects is not limited to the specific details and representative embodiments shown and described herein. Various modifications may be made without departing from the spirit or scope of the general inventive concept as defined by the appended claims and their equivalents.

What is claimed as new and is intended to be secured by Letters Patent is:

1. A method of making a molded product comprising:
   preparing a structure comprising a block copolymer or a graft copolymer having two or more phases, wherein each phase comprises polymer chains;
   decomposing the polymer chains of at least one phase of the structure; and
   cleaning the structure with a supercritical fluid or a sub-critical fluid, thereby removing the decomposed polymer chains from the structure.

2. The method of claim 1, further comprising:
   removing the decomposed polymer chains from the structure before said cleaning.

3. The method of claim 1, wherein said cleaning further comprises:
   exposing the structure to the supercritical fluid or the sub-critical fluid, thereby dissolving the decomposed polymer chains; and
   after said exposing, subjecting the exposed structure to room temperature and standard pressure.

4. The method of claim 1, wherein the polymer chains are decomposed by exposing the structure to ozone gas, energetic radiation, or ion exchange.

5. The method of claim 1, wherein the polymer chains are decomposed by exposing the structure to an electron beam.

6. The method of claim 1, wherein the supercritical fluid or the sub-critical fluid comprises carbon dioxide.

7. The method of claim 1, wherein the supercritical fluid or sub-critical fluid comprises supercritical carbon dioxide at a pressure of from 19.6 MPa to 29.4 MPa and at a temperature of from 32° C. to 80° C., or sub-critical carbon dioxide at a pressure of from 4.9 MPa to 7.4 MPa and at a temperature of from 15° C. to 31° C.

8. The method of claim 1, wherein said cleaning further comprises cleaning the structure with a mixture of a modifier selected from the group consisting of an alcohol, an acidic substance, a basic substance, a halogen gas, an aromatic organic solvent, a surfactant, and mixtures thereof, and the supercritical fluid or sub-critical fluid.

9. The method of claim 1, wherein said cleaning further comprises:
   cleaning the structure with a mixture of a modifier selected from the group consisting of an alcohol, a mixture of alcohols, an acidic substance, a basic substance, a halogen gas, an aromatic organic solvent, a surfactant, and mixtures thereof, and the supercritical fluid or the sub-critical fluid; then
   cleaning the structure with the supercritical fluid or the sub-critical fluid without the modifier.

10. The method of claim 9, wherein the modifier is methanol or ethanol.

11. The method of claim 1, wherein the structure further comprises an additive selected from the group consisting of a plasticizer, an anti-oxidant, a light stabilizer, a dye, a crosslinker, a catalyst, and mixtures thereof,
   wherein the additive comprises 20% or less by weight of the structure based on the weight of the block copolymer or the graft copolymer.

12. The method of claim 1, wherein the structure further comprises a material selected from the group consisting of a ceramic, a metal and a carbon.

13. The method of claim 1, wherein the block copolymer and the graft copolymer comprise at least one polymer chain which is decomposable by irradiation with an electron-beam, and
   at least one polymer chain which is not decomposable by irradiation with an electron-beam.

14. The method of claim 1, wherein the block copolymer or the graft copolymer comprises a first polymer chain and a second polymer chain;
   wherein the first polymer chain is selected from the group consisting of poly(isobutylene), polystyrene substituted at the α-position carbon with a methyl group or a halogen, an acrylic resin, a fluorine-containing polymer; and
   the second polymer chain is selected from the group consisting of polycyclohexane, polycyclobutadiene, polynorbornene, poly(pentamethyldisilylstyrene) and poly(vinylethylene).

15. The method of claim 14, wherein the first polymer chain is a poly(alkylmethacrylate).

16. The method of claim 1, wherein said preparing further comprises:
   coating the structure on a substrate, and after said cleaning etching the substrate through the cleaned structure.

17. The method of claim 1, wherein the block copolymer or the graft copolymer comprises a crosslinkable polymer chain.

18. The method of claim 1, wherein the block copolymer or the graft copolymer comprise:
   a polymer chain which is decomposable by irradiation with an electron-beam, and
   a polymer chain which is crosslinkable by irradiation with an electron-beam.

19. The method of claim 1, wherein the polymer chains of at least one phase are crosslinked before said cleaning.

20. A molded product prepared by the process of claim 1.

21. A thin film prepared by the process of claim 1.

22. An etch mask prepared by the process of claim 1.

23. An etched substrate, prepared by a process comprising:
   forming the etch mask of claim 22 on a substrate, and etching the substrate.

24. A battery separator prepared by the process of claim 1.

25. An electrophoresis gel prepared by the process of claim 1.

26. An optical fiber comprising cladding layer prepared by the process of claim 1.

27. A filter prepared by the process of claim 1.

28. An antireflection film prepared by the process of claim 1.

29. An electrochemical cell comprising a separator prepared by the process of claim 1.

30. A contact lens prepared by the process of claim 1.

31. A medical device comprising a molded product of claim 20.

* * * * *